Oct. 9, 1951

C. H. FAY ET AL 2,570,659

BOREHOLE GRAVITY METER

Filed Nov. 1, 1948

Inventors:
Charles H. Fay
Richard R. Goodell
By:
His Attorney

Inventors:
Charles H. Fay
Richard R. Goodell
By:
His Attorney

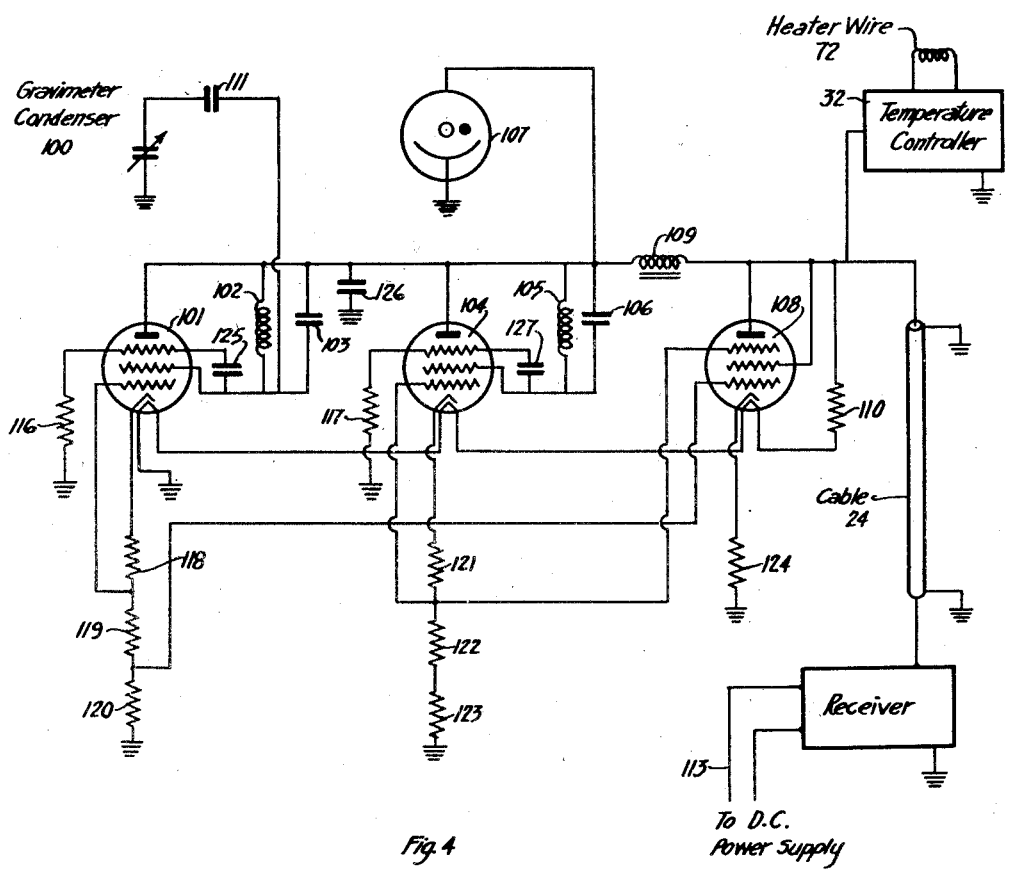

Patented Oct. 9, 1951

2,570,659

UNITED STATES PATENT OFFICE 2,570,659

BOREHOLE GRAVITY METER

Charles H. Fay and Richard R. Goodell, Houston, Tex., assignors to Shell Development Company, San Francisco, Calif., a corporation of Delaware Application November 1, 1948, Serial No. 57,758

8 Claims. (Cl. 73—382)

This invention relates to an apparatus for use in gravimetric prospecting or surveying and pertains more particularly to a gravity meter suitable for effecting gravity measurements within boreholes, such as well boreholes.

Various gravity meters, or gravimeters, are well known to the art for use in making gravity surveys while the instrument is positioned on the earth's surface. The operating principle of certain gravity meters is based on the measurement of the change in the capacitance of a condenser having one plate spring-mounted and movable in a vertical plane, said plate being in the form of a weighted mass or having a weighted mass attached thereto. The displacement of the weighted movable condenser plate is dependent on the force of gravity at each location where the gravity meter is positioned and a measurement taken.

Numerous difficulties are encountered in attempting to use any of the presently known gravity meters in deep boreholes, or wells, the most serious problem being that of providing for the extremely accurate leveling required for gravimetric devices. Considerable leveling and manual adjustment is necessary to set a condenser type gravity meter properly so that the fixed condenser plate is accurately positioned in a horizontal plane while the weighted condenser plate moves perpendicularly thereto. Inaccurate positioning of the instrument will result in unequal spacing between the condenser plates, that is, in a gap of non-uniform thickness or cross-section between said plates, in a reduction of the effective area of the plates as the edges of one overhang the other, or in a reduction in the movement of the movable plate caused by friction between the plate or its suspending spring element and the surrounding structure.

Since the temperature in a well borehole may be considerable, say as high as 250° F., and may vary at different levels, it is necessary that a borehole gravity meter be maintained at a constant temperature so that the characteristics of the spring supporting the weighted condenser plate are not changed. Additionally, the borehole gravity meter must be of a size adapted to be lowered on a cable into a small diameter borehole (say, 5 inches). It must also be contained in a fluid-tight pressure housing adapted to withstand pressures of 6,000 p. s. i. or more. Also, it is desirable that the gravity meter contain a suitable telemetering system whereby direct readings of the instrument may be made at the surface or wellhead.

It is, therefore, the primary object of the present invention to provide an apparatus for taking gravimetric readings within a well borehole. It is a further object of this invention to provide a gravity meter operating on the condenser principle, the condenser forming a part of said gravity meter being provided with self-leveling means, whereby the necessity for manual leveling adjustments is substantially eliminated.

It is a further object of this invention to provide a gravity meter comprising a condenser having a fixed plate and a movable resiliently supported plate, said plates having faces formed as concentric spherical surfaces of suitably selected area, whereby the spacing between said plates and the effective area thereof remain constant for a given value of the force of gravity, and are not affected by minor errors in the leveling adjustment of the gravity meter.

Another object of the present invention is to provide a self-leveling borehole gravity meter of simple and sturdy construction that is adapted to operate in a small-diameter borehole while being subjected to considerable temperatures and pressures.

A further object of the present invention is to provide a self-leveling borehole gravity meter containing a telemetering system whereby the readings taken by the instrument may be read directly at the surface of the borehole.

It is a further object of this invention to provide a gravity meter comprising a thermostatic control system whereby the operation of the gravity meter is made independent of the temperatures prevailing in deep boreholes.

These and other objects of this invention will be understood from the following description of a preferred embodiment of the apparatus of the present invention as shown in the accompanying drawing, wherein:

Figure 4 is a schematic diagram of the electrical circuit of a telemetering system to be used for measuring and indicating changes in position of the suspended system within the gravity meter.

Figure 1:
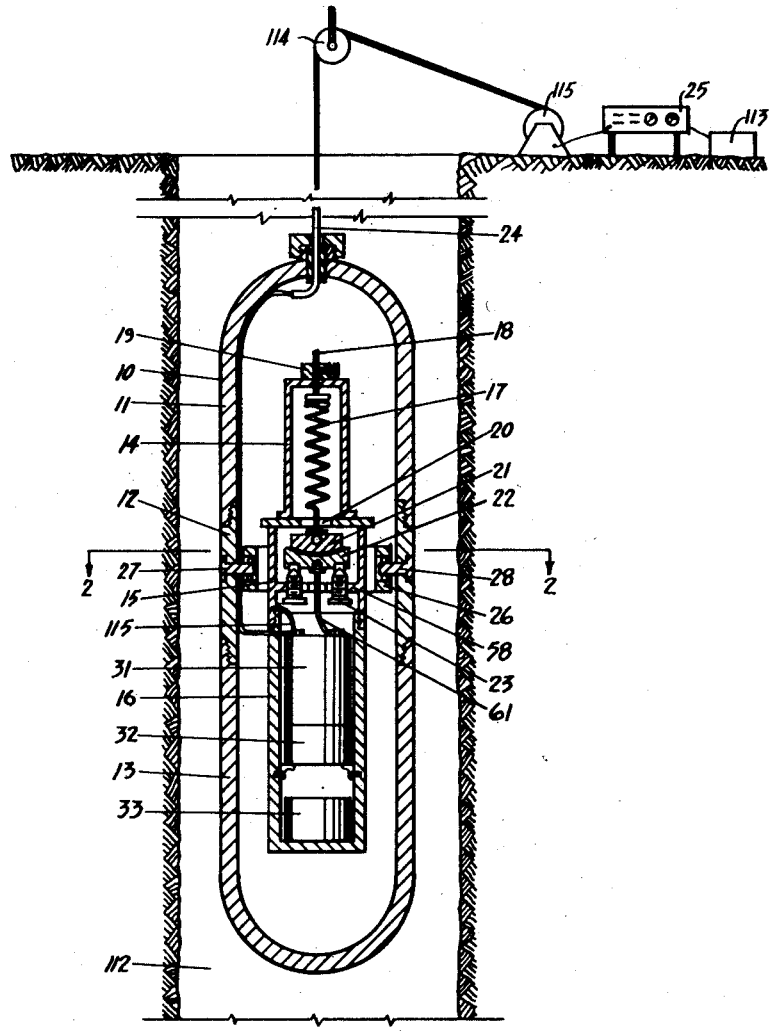
Figure 1 is a view, partly in longitudinal section, of the gravity meter of the present invention positioned in a well borehole.

Referring to Figure 1 of the drawing, the borehole gravity meter comprises a cylindrical high pressure casing 10 which is preferably divided into sections 11, 12 and 13 which are joined together in any suitable pressure-tight manner, as by screw threads. Contained within said casing 10 is a tubular housing which is preferably divided in an upper section or spring housing 14, a middle section or condenser housing 15 and a lower section or circuit housing 16, said sections being connected together in any suitable manner, as by screw threads, bolts, or the like.

A spring 17 is suspended from the top of the spring housing 14 being connected to a rod 18 mounted for sliding movement through an opening in the top of the housing. Nut means 19, for securely positioning the rod 18, are affixed to that portion of the rod extending through the top of the housing. The spring housing 14 and condenser housing 15 are in communication through an opening 20 in the top of the condenser housing. The lower end of the spring 17 extends through said opening 20 and is fixedly secured to a weighted mass 21 having a convex, preferably spherical, lower surface which forms the top plate of a condenser positioned in said condenser housing. The bottom plate 22 of the condenser comprises a metallic block having a concave, preferably spherical, top surface. The spherical faces of the two plates are formed so as to be concentric. The plate 22 is mounted and electrically insulated by suitable means such, for example, as three or more adjustable leveling screws 23.

The circuit housing 16 contains a suitable telemetering system, indicated in Figure 1 by numeral 31. This system is responsive to any change in the distance between the condenser plates 21 and 22 and is adapted to transmit a signal proportional to such change up a cable 24 to a receiver or indicating device 25 at the surface. Preferably, means for maintaining the suspension spring 17 at a constant temperature are also housed in section 16, being represented by numeral 32. If desired, an additional mass or weight 33 may be carried in the bottom of the lower housing section 16 to lower the center of gravity of the housing.

Figure 2:
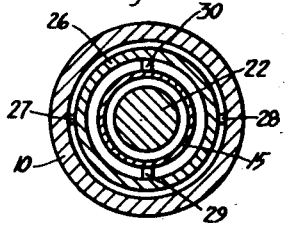
Figure 2 is a view in cross section taken along the line 2—2 in Figure 1.

Since it is important that the plates 21 and 22 of the variable condenser be positioned in a substantially horizontal position, i. e., at right angles to the gravitational pull, self-adjusting leveling means are provided for maintaining the housing sections 14, 15 and 16 in a vertical position in the casing 10. Referring to Figures 1 and 2, the self-leveling means may comprise ring means 26 positioned in radial spaced relationship between the casing 10 and the middle section 15 of the housing, being pivotally secured to said casing 10 by diametral pivot pins 27 and 28 and to said housing section 15 by diametral pivot pins 29 and 30 which are positioned 90 degrees from pins 27 and 28 in the same horizontal plane.

Figure 3:
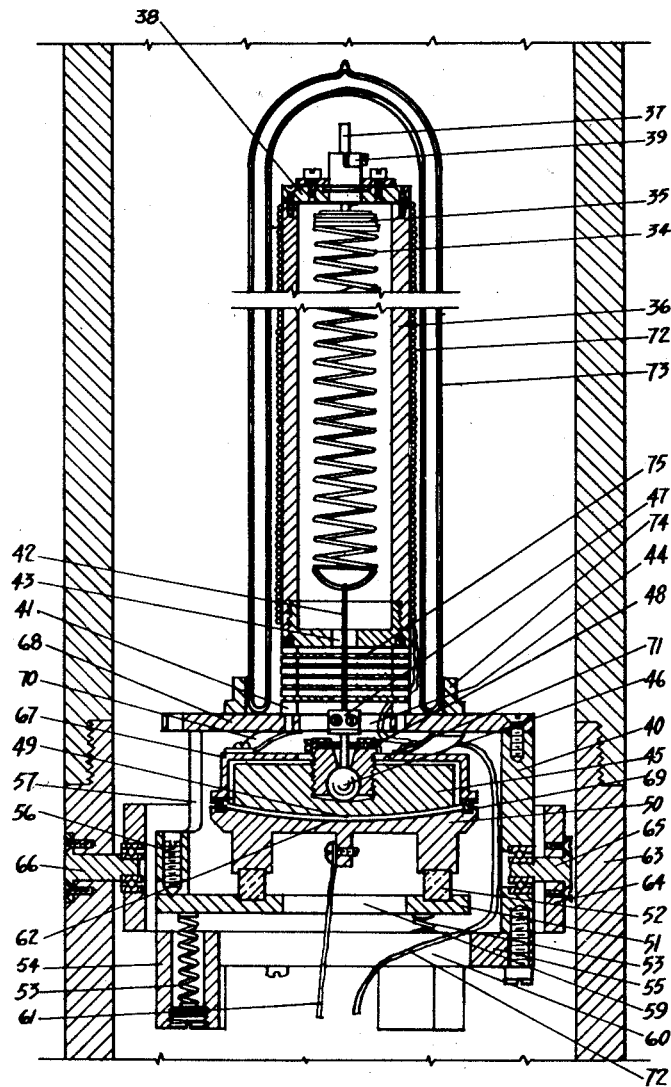
Figure 3 is a view, partly in longitudinal section, of a preferred embodiment of the suspended condenser system of the present gravity meter.

A preferred embodiment of the borehole gravity meter is shown in Figure 3. In this embodiment the suspension spring 34 is secured to a spring holder 35 within the spring housing 36. A rod 37 on the top of the holder 35 extends up through the top plate 38 of said housing 36 and may be adjustably secured at any position by suitable clamping means 39.

The spring housing 36 may be secured directly to the condenser housing 40 or it may be supported thereabove on a plurality of legs or rods 41 as shown in Figure 3. A suspension 42, fixedly attached to the lower end of the spring 34, extends downwardly through coaxial openings 43 and 44 in the bottom of the spring housing 36 and in the top of the condenser housing 40, respectively.

The condenser, mounted in its housing 40, has a top plate 45 of relatively considerable mass with a ball-and-socket joint 46 fixedly secured to the top of the plate 45 and forming universal joint means therewith. The suspension 42 depending from the spring 34 is secured by a clamp 47 to the ball-and-socket joint. A plurality of set screws 48 radially mounted in the socket permit the ball to be fixedly positioned therein so that the top plate is normal to the suspending spring 34 and suspension 42. The bottom of the suspended mass 45 which constitutes the top plate of the condenser has a spherical surface 49 of a radius of curvature substantially equal to the distance from the lower face of the plate to the effective axis of rotation of the suspended system for tilt, i. e., the top suspension point of the spring 34. Thus, the mass 45 is mounted for movement in an arc at its radius of curvature, and also for movement radially from its point of suspension against the tension of the spring.

The bottom or fixed plate 50 of the condenser is mounted on a vertically adjustable plate 51, being insulated therefrom by suitable insulating blocks 52, said blocks being preferably of a hard material such as sapphire. The plate 51 is mounted on three or more springs 53 which are recessed in a like number of bosses 54 formed in the supporting lower plate 55. Three or more adjustment screws 56, which may be mounted in the top of said housing 40 or cut-out portions 57 thereof, permit vertical adjustment of the support plate 51 against the support springs 53 thus enabling the lower condenser plate 50 to be accurately leveled in a substantially horizontal plane. The construction of the leveling means shown in Figure 3 is preferred since the fixed condenser plate 50 may be leveled by adjustment from above, thus obviating the need of first removing any equipment below the condenser before the adjustment can be made. It is realized, however, that any suitable fixed condenser plate leveling means may be employed, an alternative means being shown in Figure 1 which comprises a plurality of three or more leveling screws 23 which are mounted in the base plate 58 of the condenser housing 15. The lower fixed condenser plate 50 constitutes the high potential plate of the variable gravimeter condenser 100 shown in Figure 4. The top movable plate 45 is grounded to the housing 36 through the spring 34. A suitable ground lead 115 (Figure 1) electrically connects the housing to the telemetering system 31.

Referring to Figure 3, the leveling plate means 51 and the base plate 55 of the condenser housing 40 have registering openings 59 and 60 therethrough, thus permitting electrical lead 61 to be connected between the fixed plate 50 of the condenser and the telemetering system located below the condenser. The top surface 62 of the bottom condenser plate 50 is concave having a radius of curvature that is equal to the distance from said plate 50 to the axis of rotation of the suspended system for tilt, i. e., the top suspension point of spring 34. Thus, when the top and bottom condenser plates 45 and 50, respectively, are accurately positioned in spaced relationship to each other, the top plate 45 may swing across the fixed bottom plate 50 when the system is tilted without affecting the spacing between said plates.

Both condenser plates 45 and 50 have preferably a circular periphery, the lower plate 50 having a larger diameter than the upper plate. This is especially important as it permits the depending upper plate 45 to be movably displaced from its normal coaxial position with relation to the lower plate without causing any change in capacitance of the condenser as the effective area of the plates remains constant. Since the screws 56 provide means for adjusting the concave lower plate 50 so that its center of curvature is on the vertical line through the effective axis of rotation of the suspended system, the capacitance of the condenser is inherently insensitive to leveling over a considerable range of tilt.

For coarse leveling of the instrument within its pressure-tight casing 63, the instrument is mounted in gimbals carried within said casing, as shown in Figure 1 and described above. In Figure 3, the gimbals are shown as comprising an annular member 64 mounted coaxially within the casing 63 and about the instrument housing (preferably the condenser housing 40), said ring 64 being pivoted by suitable pivot pins 65 and 66 to said housing and casing, respectively. For purposes of illustration pivot pins 65 and 66 are shown as positioned diametrically opposite to each other, but it will be understood that in actual practice they are positioned in a manner similar to that shown in Figure 2.

Preferably, means for damping and limiting the movement of the upper condenser plate 45 are provided to materially lessen the time required for the suspended system to come to rest. The damping means may comprise a metallic or non-metallic cylindrical cap or ring 67 which may be secured to the cover 68 of the condenser housing 40 or may be mounted around the upper condenser plate 45 and between the cover 68 and the lower condenser plate 50. If the cap 67 is metallic, it is necessary that it be insulated from the lower condenser plate 50 by jewel blocks, bearings, or a ring gasket 69 of suitable insulating material. The cap 67 may be fixedly positioned in place by suitable spring means 70 between said cover 68 and cap 67, being thereby grounded so as not to affect the self-leveling. Aperture means 71 are provided in the top of the cap 67 to accommodate suspension 42 or ball-and-socket joint 46 of the apparatus. The cap 67 serves to damp the motion of the mass or upper condenser plate 45 in two respects: first, because of the small distance the mass 45 can move before striking the cap it can acquire very little energy, and second, the small air space between the mass and the cap increases the air damping of the system considerably.

Since the temperature of well boreholes often varies at different levels, a borehole gravity meter positioned therein is adversely affected by temperature changes. Thus, a rise in temperature would cause an expansion of most of the parts of the instrument and would particularly affect the characteristics of the spring 34, which in turn would change the spacing between the condenser plates 45 and 50 and, therefore, the capacitance of said condenser.

To eliminate these temperature errors, the suspension spring 34 is maintained at a substantially constant temperature by suitable temperature control means, preferably at the highest temperature (say, 250° F.) which may be encountered in the borehole under survey. Suitable means of maintaining the spring 34 and its housing 36 at a high constant temperature are shown in Figure 3, wherein a suitable length of heater wire 72 is wound around the spring housing 36, said wire being connected to suitable power supply and temperature control means such, for example, as those shown at 32 in Figure 1, positioned below the condenser housing 40. Preferably, the heater wire 72 is covered with heat insulating material over that portion of the wire that is not wound on the spring housing 36. Fluctuations of temperature within the heated spring housing 36 may be further eliminated by surrounding said housing with insulating material such as asbestos, cork, fiberglass, etc., or with suitable insulating means such as a vacuum bottle 73, as shown in Figure 3, which may be positioned in a ring or collar 74 secured to the top 68 of the condenser housing 40. If desired, a plurality of plates 75 forming radiation and convection baffles may be mounted on the legs 41 below the heated spring housing 36, said baffles having openings registering with the opening 44 in the bottom of said housing whereby rod 42 may be positioned for movement therein. Preferably, the baffles 75 are made of silver or other metal or alloy having high thermal reflectivity. If desired, the condenser housing 40 may be maintained at a constant predetermined temperature in a similar manner. It is to be understood that the heater wire 72 is to be electrically connected to suitable automatic thermoregulator means that are adapted to control the current supplied to said heater wire to maintain the apparatus at a substantially constant temperature. The mechanism of such thermoregulator means, forming no part of this invention and being well known to the art, will not be described here.

Since it is desirable that the spacing between the condenser plates be affected only by gravitational forces acting on the movable mass or upper condenser plate 45, the spring 34, spring housing 36, support legs 41, condenser housing 40 and condenser plates 45 and 50 are preferably made of a material having substantially a zero thermal expansion coefficient and a low heat conductivity. Certain nickel-iron alloys, such as Invar, are known to possess these characteristics.

The borehole gravity meter of the present invention is essentially a two-plate variable condenser whose capacitance is subject to change with changing gravitational forces acting on one movable plate of the condenser. Hence, variations in gravitational forces may be determined by connecting the variable condenser in a suitable electrical circuit and transmitting effects due to changes in capacitance to properly calibrated indicating or recording means preferably located at the surface of a well borehole. A telemetering system adapted to accomplish this is shown in Figure 4.

The variable gravimeter condenser 100 forms part of the tuned circuit of a variable frequency oscillator comprising a pentode tube 101, inductance 102 and capacitor 103. A second oscillator having a fixed frequency nearly identical to that of the variable oscillator is included in the circuit and comprises a pentode tube 104, inductance 105 and capacitor 106. A gas filled voltage regulator tube 107 maintains a substantially constant voltage supply to the pentodes. The fixed oscillator operates at a fixed frequency, for example, 500 kilocycles, while the variable oscillator varies between, for example, 400 and 500 kilocycles. The signals from the two oscillators are mixed together in a mixer-amplifier tube 108, and a frequency equal to the difference between these two frequencies is transmitted by the mixer 108 up the cable 24 to the surface. Power for the oscillator circuits and for temperature control equipment 32 is also supplied by the cable 24 from any suitable D. C. power supply 113. The frequency transmitted up the cable is measured and recorded at the surface by suitably calibrated receiver or recorder means 25.

Also included in the oscillator circuit is a choke coil 109 serving to minimize any tendency of the signal from the mixer 108 to affect the plates of the pentode tubes 101 and 104. A blocking resistor 110 is inserted to reduce the voltage in the heater circuit of the pentode tubes and to block radio frequency from going to ground through the heater circuit. An auxiliary condenser 111 may be inserted to determine the proper value of condenser 100 and to block the D. C. voltage from condenser 100. Numerals 116 to 127 indicate various resistances and condensers desirable for a superior performance of the oscillator circuit, although various modifications in the arrangement of this circuit are possible without departing from the spirit of the invention, as will be readily understood by those familiar with the art of electronics.

In operation, the present borehole gravity meter is enclosed in its pressuretight casing 10 and lowered into a well borehole 112 at the end of the cable 24 which may be unwound from suitable hoist means 115 and suspended from a sheave 114 (Figure 1). When the gravity meter is positioned at any level within the borehole, coarse leveling of the gravimeter within the casing 10 is automatically effected by the gimbals which allow the pivotally mounted and connected housings 14, 15 and 16 to tilt in any vertical plane caused by gravitational forces acting thereon. Primary leveling is thus effected to an accuracy within a few minutes of arc. Fine leveling is automatically accomplished by the suspended upper condenser plate 45 moving slightly across the fixed lower condenser plate 50, whereby the gravitational force is always applied along the radial lines of the convex and concave condenser plates 45 and 50. Since the upper condenser plate 45 is of a smaller diameter than the lower plate 50, it is adapted to change its position to accurately level the instrument without protruding the edge of the lower plate 50 for the small deviations from the vertical permitted by the primary leveling means. Thus, any change in capacitance of the gravity meter condenser is caused only by a change in the gravitational force acting on the suspended mass or upper plate 45 of the condenser.

While the present gravimeter has been described mainly in reference to use in a borehole, it is also to be understood that the suspended system of the present invention can be incorporated in surface gravimeters thus obviating much of the hand leveling of the instrument. The design of the present gravimeter is likewise especially suitable for use in underwater gravimetric surveys.

We claim as our invention:

1. A gravity meter comprising a housing, a body having a spherical downwardly convex lower face, a second body mounted within said housing having a spherical upwardly concave upper face, resilient means within said housing supporting said first body suspended over said second body, the convex face of said first body being separated from the concave face of said second body by a uniform distance determined by the pull of gravity on said resilient supporting means, said two faces being cencentric with regard to the point of suspension of said first body, an oscillator circuit, means electrically connecting said two bodies into said oscillator circuit as the two plates of a condenser, the frequency of said oscillator circuit being controlled by the capacity of said condenser, means for indicating the variations of said frequency occurring in response to changes in the capacity of said condenser as the spacing between said bodies is varied proportionally to changes in the force of gravity acting on said suspended body, a casing surrounding said housing, and means for supporting said housing for substantial self-leveling within said casing.

2. A gravity meter comprising a housing, a body having a spherical downwardly convex lower face, a second body fixedly mounted within said housing having a spherical upwardly concave upper face, resilient means within said housing supporting said first body suspended for vertical and transverse movement over said second body, the convex face of said first body being separated from the concave face of said second body by a uniform distance determined by the pull of gravity on said resilient supporting means, said two faces being concentric with regard to the point of suspension of said first body, an oscillator circuit, means electrically connecting said two bodies into said oscillator circuit as the two plates of a condenser, the frequency of said oscillator circuit being controlled by the capacity of said condenser, means for indicating the variations of said frequency occurring in response to changes in the capacity of said condenser as the spacing between said bodies is varied proportionally to changes in the force of gravity acting on said suspended body, a casing surrounding said housing, primary leveling means for supporting said housing for substantial self-leveling within said casing, said resilient means and said first suspended body forming secondary leveling means, and temperature controlling means surrounding said resilient means.

3. A gravity meter adapted to be lowered on a conductor cable into a well borehole, said gravity meter comprising a housing, a body mounted in said housing having a spherical downwardly convex lower face, a second body fixedly mounted within said housing having a spherical upwardly concave upper face, resilient spring means within said housing supporting said first body suspended for vertical and transverse movement over said second body, the convex face of said first body being separated from the concave face of said second body by a uniform distance determined by the pull of gravity on said resilient supporting spring means, said two faces being concentric with regard to the point of suspension of said first body, a pressure-tight casing surrounding said housing of a size to pass through the well borehole, primary leveling means for supporting said housing for substantial self-leveling within said casing, said resilient means and said first suspended body forming secondary leveling means, temperature controlling means surrounding said resilient means, an oscillator circuit, means electrically connecting said two bodies into said oscillator circuit as the two plates of a condenser, the frequency of said oscillator circuit being varied by a change in the capacity of said condenser, said oscillator signal being transmitted by the cable up the borehole to the wellhead, and means located at the wellhead for indicating the variations of said frequency occurring in response to changes in the capacity of said condenser as the spacing between said bodies is varied proportionally to changes in the force of gravity acting on said suspended body.

4. A gravity meter comprising in combination a casing, a housing in said casing, means supporting the housing for substantial self-leveling within the casing, spring means depending within said housing and in spaced relationship with the walls thereof, a mass attached to the lower end of said spring means and movable within said housing as a function of the force of gravity thereon, the lower surface of said mass being downwardly convex and forming the upper plate of a variable condenser, a lower plate for said condenser fixedly mounted within said housing in spaced relationship with the depending mass, said lower plate having an upwardly concave top surface, and electrical circuit means for measuring the change in capacitance of said condenser whereby changes in the position of the mass due to the action of gravitational force thereon can be measured.

5. A gravity meter comprising in combination a casing, a housing in said casing, gimbal means supporting the housing for substantial self-leveling within the casing, spring means depending within said housing and in spaced relationship with the walls thereof, a mass attached to the lower end of said spring means and movable within said housing as a function of the force of gravity thereon, the lower surface of said mass being downwardly convex and forming the upper plate of a variable condenser, a lower plate for said condenser fixedly mounted within said housing in spaced relationship with the depending mass, said lower plate having an upwardly concave top surface of larger area than the convex surface of the upper plate, electrical circuit means for measuring the change in capacitance of said condenser whereby changes in the position of the mass due to the action of gravitational force thereon can be measured, and means for maintaining the temperature of said spring means and condenser at a substantially constant value.

6. A gravity meter comprising in combination a casing, a housing in said casing, gimbal means supporting the housing for substantial self-leveling within the casing, spring means depending within said housing and in spaced relationship with the walls thereof, a cylindrical mass attached in an adjustable manner to the lower end of said spring means and movable within said housing as a function of the force of gravity thereon, the lower surface of said mass being downwardly convex and forming the upper plate of a variable condenser, a lower plate for said condenser adjustably mounted in an insulated manner within said housing in spaced relationship with the depending mass, said lower plate having an upwardly concave top surface of larger area than the convex surface of the upper plate, and oscillator circuit means for measuring the change in capacitance of said condenser whereby changes in the position of the mass due to the action of gravitational force thereon can be measured.

7. A gravity meter comprising in combination a casing, a housing in said casing, gimbal means supporting the housing for substantial self-leveling within the casing, spring means depending within said housing and in spaced relationship with the walls thereof, a cylindrical mass attached to the lower end of said spring means and movable vertically and horizontally within said housing as a function of the force of gravity thereon, means for adjusting said mass at the lower end of said spring means, means for damping the motion of said movable mass, the lower surface of said mass being downwardly convex and forming the upper plate of a variable condenser, a cylindrical lower plate for said condenser mounted within said housing in spaced relationship with the depending mass, said lower plate having an upwardly concave top surface of larger area than the convex surface of the upper plate, means for adjusting said lower plate in a substantially horizontal plane within said housing, oscillator circuit means for measuring the change in capacitance of said condenser whereby changes in the position of the mass due to the action of gravitational force thereon can be measured, a heater coil carried within said housing adjacent said spring means for maintaining the temperature thereof at a substantially constant value, and insulator means surrounding said heater coil within said housing.

8. A gravity meter comprising a fixed body having a spherical upwardly concave upper face, a movable body mounted above the first body and having a spherical downwardly convex lower face, resilient means suspending said movable body over said fixed body, the concave face of said fixed body being separated from the convex face of said movable body by a uniform distance determined by the pull of gravity on said resilient suspending means, said two faces being concentric with regard to the point of suspension of said movable body, an oscillator circuit, means electrically connecting said two bodies as the two plates of a condenser in said oscillator circuit, the frequency of said oscillator circuit being controlled by the capacity of said condenser, and means for indicating the variations of said frequency occurring in response to changes in the capacity of said condenser as the spacing between said bodies is varied proportionally to changes in the force of gravity acting on said movable body.

CHARLES H. FAY.
RICHARD R. GOODELL.

REFERENCES CITED

The following references are of record in the file of this patent:

UNITED STATES PATENTS

| Number | Name | Date |
|---|---|---|
| 2,131,737 | Holt | Oct. 4, 1938 |
| 2,179,892 | Lindblad | Nov. 14, 1939 |
| 2,301,396 | Graf | Nov. 10, 1942 |
| 2,316,915 | Truman | Apr. 20, 1943 |
| 2,322,681 | Zenor | June 22, 1943 |
| 2,346,593 | Lindblad | Apr. 11, 1944 |
| 2,384,759 | Hasbrook | Sept. 11, 1945 |